United States Patent Office 2,726,125
Patented Dec. 6, 1955

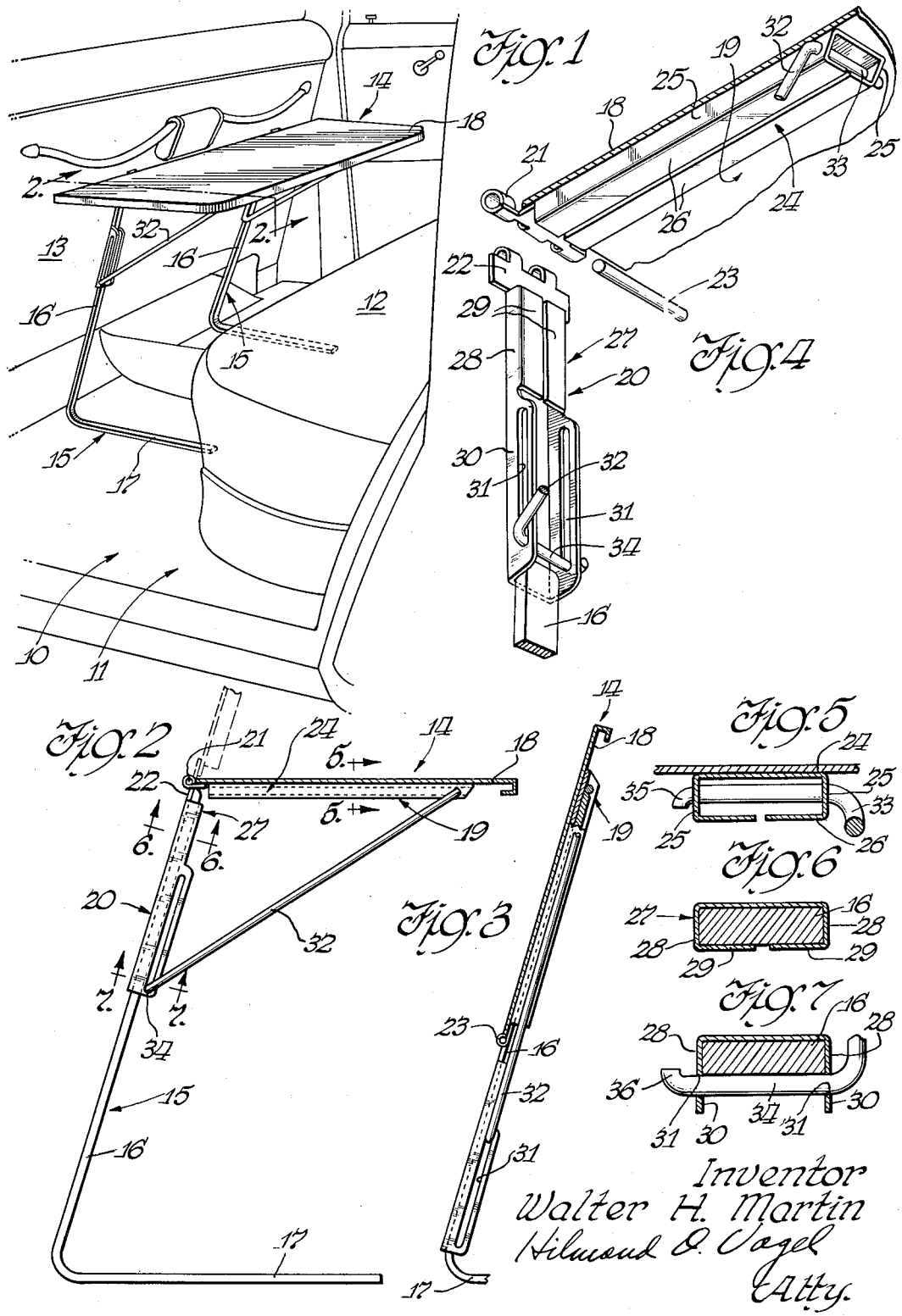

2,726,125

COLLAPSIBLE AUTOMOBILE TABLE WITH SLIDING HINGE BRACKETS

Walter H. Martin, Western Springs, Ill.

Application September 25, 1953, Serial No. 382,260

3 Claims. (Cl. 311—21)

This invention relates to a collapsible table particularly useful in the rear compartment of an automobile. More particularly, this invention relates to a table having a table top that can readily be hinged to an out-of-the-way position when desired.

It is a prime object of this invention to provide an improved table which can easily be used in the rear compartment of an automobile and which includes a top that can quickly be moved to a stored position.

A more specific object of this invention is to provide a collapsible table having sliding hinge brackets arranged to a telescope and slide relative to the supporting members of the table so that the table top can be easily moved to a stored position.

These and further specific objects will become more apparent from a reading of the description when examined in connection with the drawing.

In the drawing:

Figure 1 is a perspective view of a portion of an automobile showing the improved table positioned in a normal use position in the rear compartment of an automobile;

Figure 2 is a side elevational view of an improved collapsible table, partially in section and taken along the line 2—2 of Figure 1;

Figure 3 is an elevational view, partially in section and similar to Figure 1, showing the table top of the table in a stored position;

Figure 4 is a detail enlarged perspective view of a pair of hinge brackets, the view being slightly exploded to show details of construction;

Figure 5 is a detail sectional view taken along the line 5—5 of Figure 2;

Figure 6 is a detail sectional view taken along the line 6—6 of Figure 2; and

Figure 7 is a detail sectional view taken along the line 7—7 of Figure 2.

Referring particularly to Figure 1, a conventional automobile is generally designated by the reference character 10. The automobile 10 includes a rear compartment 11 positioned between the rear seat 12 and the back of a front seat 13. A collapsible table, generally designated at 14, is positioned in the rear compartment 11.

The collapsible table comprises a pair of laterally spaced supporting members 15. The supporting members 15 include upright members 16 and base members 17 which are connected in L-shaped configuration with the base members 17 resting on the floor of the automobile 10. A top 18 is connected to the supporting members 15.

Connecting means for the top 18 are provided in the form of first hinge blackets 19 which are firmly connected, in a suitable manner, to the underneath side of the table top 18. Second hinge brackets 20 are connected to the supporting members 15. The hinge blackets 19 and 20 are hingedly interconnected by means of hinge portions 21 and 22 secured by hinge pins 23.

The hinge bracket 19 is provided with a tubular slide member 24 having flanges 25 and 26 positioned to create a box section. The hinge brackets 20 are provided with a tubular slide member 27 having flanges 28 and 29 to form a box section. The flanges 28 are also provided with portions 30 having elongated slots 31.

Diagonally extending braces 32 have at their upper ends laterally extending hinge portions 33 which are pivotally mounted with respect to the ends of the slide member 27. The lower ends of the braces 32 are provided with laterally extending hinge portions 34 which extend through the slots 31 of the slotted portions 30 in hinging and pivotal relation. The hinge portions 33 and 34 are respectively provided with bent ends 35 and 36 to retain the braces 32 against lateral displacement relative to the hinge brackets 19 and 20.

Normal use of the table 10 is indicated in Figures 1 and 2. In this position the table top 18 is securely held on the upper ends of the upright members 16. The hinge brackets 20 have their slide members 27 in secure telescoping engagement with the upper ends of the members 16. The braces 32 are held in diagonal supporting relation and the table 10 can be expeditiously used by persons seated on the rear seat 12.

Assuming now that it is desired to store the table top to an out-of-the-way position, the user merely pivots the top 18 in counterclockwise manner on the hinge brackets 19 and 20 until the top 18 is in a substantially upright position, as indicated in dotted lines of Figure 2. The hinge portions 34 of the brace 32 are now moved upwardly in the slots 31 by this hinging movement of the top 18. The tubular slide members 24 are now in substantially vertical alignment with the upper ends of the upright members 16 so that upon downward movement of the top 18, they will telescopingly engage the upright members 16 and follow the slide members 27 down on said members 16, as clearly indicated in Figure 3.

The table top is now securely held in a stored position in contiguous relation with respect to the upright members and flatly against the back of the front seat 13.

In the normal position, the hinge brackets 20 are, of course, held against downward sliding movement on the members 16 by virtue of the position of the hinge brackets 19 relative to said members 16.

Thus, a simple and effective collapsible table has been described. It can, of course, be appreciated that the hinge brackets 19 and 20 need not be tubular but may have their flanges suitably positioned so that the members 16 may be slidingly engaged.

Changes in the construction may also be made which do not depart from the spirit of the invention or the scope thereof as defined in the appended claims.

What I claim is:

1. A collapsible table comprising a pair of laterally spaced supporting members, said supporting members each including an upright member and a base member connected to the upright member in L-shaped configuration, a table top normally extending horizontally, means connecting said top to said supporting members comprising a first pair of hinge brackets connected to the normally underneath side of said top, said first hinge brackets each including a first hinge portion and a substantially first tubular slide member, a pair of second hinge brackets, each of said second hinge brackets including a second hinge portion and a substantially tubular second slide member, each of said second slide members being telescopingly connected for sliding movement on said upright members, means connecting said first and second hinge portions for relative hinging movement, each of said second slide members having elongated slotted portions, a pair of diagonally extending braces, each brace including an upper end portion pivotally connected to a first bracket, and a lower end portion on each brace pivotally and slidably connected to said slotted portions, said table top being hingedly movable with respect to said upright members from the normal position to a substantially upright position whereupon said first tubular slide members may be telescopingly engaged with said upright members above said second tubular slide members and said table top may be moved to a substantially vertical stored position.

2. A collapsible table comprising a plurality of laterally spaced supporting members, said supporting members each including an upright member and a base member connected to the upright member in L-shaped configuration, a table top normally extending horizontally, means connecting said top to said supporting members comprising a plurality of first hinge brackets connected to said top, said first hinge brackets each including a first hinge portion and a substantially first tubular slide member, a plurality of second hinge brackets, each of said second hinge brackets including a second hinge portion and a substantially tubular second slide member, each of said second slide members being telescopingly connected for sliding movement on said upright members, means connecting said first and second hinge portions for relative hinging movement, each of said second slide members having elongated slotted portions, a plurality of extending braces, each brace including an upper end portion pivotally connected to a first bracket and a lower end portion on each brace pivotally and slidably connected to said slotted portions, said table top being hingedly movable with respect to said upright members from the normal position to a substantially upright position whereupon said first tubular slide members may be telescopingly engaged with said upright members above said second tubular slide members and said table top may be moved to a substantially vertical stored position.

3. A collapsible table comprising a plurality of laterally spaced supporting members, each supporting member including an upright member and a base member connected thereto, a table top normally extending horizontally, means connecting said table top to said supporting members comprising a plurality of first hinge brackets connected to said top, said hinge brackets each including a first hinge portion and a first flanged slide member, a plurality of second hinge brackets including a second hinge portion and a second flanged slide member, each of said second slide members being connected to said upright members for relative sliding movement, means connecting said first and second hinge portions for relative hinging movement, one of said second slide members having a slotted portion, a brace pivotally connected at one end to said table top, and means on the other end of said brace pivotally and slidingly engaging said slotted portion, said table top being hingedly movable with respect to said upright members from the normal position to a substantially upright position whereupon said first slide members may slidingly engage said upright members above said second slide members, and said table top may be moved to a substantially vertical stored position.

References Cited in the file of this patent

UNITED STATES PATENTS

| | | |
|---|---|---|
| 921,468 | Scheibner | May 11, 1909 |
| 1,380,007 | Osterberg | May 31, 1921 |
| 1,394,526 | Amsden | Oct. 25, 1921 |
| 1,780,706 | Goldbecher | Nov. 4, 1930 |
| 2,353,064 | Parham | July 4, 1944 |
| 2,500,542 | Greene | Mar. 14, 1950 |
| 2,556,724 | Hubsch | June 12, 1951 |